(12) United States Patent
Camp et al.

(10) Patent No.: US 9,632,927 B2
(45) Date of Patent: Apr. 25, 2017

(54) REDUCING WRITE AMPLIFICATION IN SOLID-STATE DRIVES BY SEPARATING ALLOCATION OF RELOCATE WRITES FROM USER WRITES

(71) Applicant: International Business Machines Corporation, Armonk, NY (US)

(72) Inventors: Charles J. Camp, Sugar Land, TX (US); Timothy J. Fisher, Cypress, TX (US); Aaron D. Fry, Richmond, TX (US); Nikolas Ioannou, Zurich (CH); Ioannis Koltsidas, Zurich (CH); Roman Pletka, Uster (CH); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 14/497,243

(22) Filed: Sep. 25, 2014

(65) Prior Publication Data

US 2016/0092352 A1 Mar. 31, 2016

(51) Int. Cl.
*G06F 12/02* (2006.01)
(52) U.S. Cl.
CPC ...... *G06F 12/0253* (2013.01); *G06F 12/0246* (2013.01); *G06F 2212/1036* (2013.01); *G06F 2212/2022* (2013.01); *G06F 2212/7205* (2013.01)
(58) Field of Classification Search
None
See application file for complete search history.

(56) References Cited

U.S. PATENT DOCUMENTS

| 7,941,591 | B2 | 5/2011 | Aviles |
| 8,185,778 | B2 | 5/2012 | Kilzer et al. |
| 8,285,918 | B2 | 10/2012 | Maheshwari |
| 8,327,110 | B2 | 12/2012 | Yamamoto |
| 8,402,242 | B2 | 3/2013 | Hu et al. |
| 8,463,983 | B2 | 6/2013 | Eleftheriou et al. |
| 8,756,375 | B2 | 6/2014 | Flynn |

(Continued)

FOREIGN PATENT DOCUMENTS

| CN | 102609360 A | 7/2012 |
| EP | 1521268 A2 | 4/2005 |

(Continued)

OTHER PUBLICATIONS

Camp et al., U.S. Appl. No. 14/566,639, filed Dec. 10, 2014.
(Continued)

*Primary Examiner* — Brian Peugh
*Assistant Examiner* — Tracy Chan
(74) *Attorney, Agent, or Firm* — Zilka-Kotab, PC

(57) ABSTRACT

In one embodiment, a method includes maintaining a first open logical erase block for user writes, maintaining a second open logical erase block for relocate writes, wherein the first and second open logical erase blocks are different logical erase blocks, receiving a first data stream having the user writes, transferring the first data stream to the first open logical erase block, receiving a second data stream having the relocate writes, and transferring the second data stream to the second open logical erase block. Other systems, methods, and computer program products are described in additional embodiments.

14 Claims, 9 Drawing Sheets

(56) References Cited

U.S. PATENT DOCUMENTS

| | | |
|---|---|---|
| 8,838,935 B2 | 9/2014 | Hinton et al. |
| 2004/0158675 A1 | 8/2004 | Hirose |
| 2008/0034154 A1 | 2/2008 | Lee et al. |
| 2009/0164724 A1 | 6/2009 | Hirose |
| 2010/0262687 A1 | 10/2010 | Shen et al. |
| 2011/0066788 A1 | 3/2011 | Eleftheriou et al. |
| 2011/0087855 A1 | 4/2011 | Frost et al. |
| 2011/0093648 A1 | 4/2011 | Belluomini et al. |
| 2011/0213919 A1 | 9/2011 | Frost et al. |
| 2012/0079232 A1 | 3/2012 | Hinton et al. |
| 2012/0166709 A1 | 6/2012 | Chun |
| 2012/0284587 A1 | 11/2012 | Yu et al. |
| 2012/0297122 A1* | 11/2012 | Gorobets ............ G06F 12/0246 711/103 |
| 2012/0317337 A1 | 12/2012 | Johar et al. |
| 2013/0024609 A1 | 1/2013 | Gorobets et al. |
| 2013/0054873 A1 | 2/2013 | Belluomini et al. |
| 2013/0061019 A1 | 3/2013 | Fitzpatrick et al. |
| 2013/0159626 A1 | 6/2013 | Katz et al. |
| 2013/0185526 A1 | 7/2013 | de la Iglesia et al. |
| 2013/0205183 A1 | 8/2013 | Fillingim et al. |
| 2013/0332668 A1 | 12/2013 | Diep et al. |
| 2014/0068157 A1 | 3/2014 | Makuni et al. |
| 2014/0075099 A1 | 3/2014 | Ooneda |
| 2014/0095775 A1 | 4/2014 | Talagala et al. |
| 2014/0223094 A1 | 8/2014 | Baderdinni et al. |
| 2014/0304454 A1 | 10/2014 | Ellis et al. |
| 2014/0351526 A1 | 11/2014 | Peterson |
| 2015/0052395 A1 | 2/2015 | Wipfel |
| 2015/0177995 A1 | 6/2015 | Camp et al. |
| 2015/0220385 A1 | 8/2015 | Wood et al. |
| 2016/0170870 A1 | 6/2016 | Camp et al. |
| 2016/0179678 A1 | 6/2016 | Camp et al. |

FOREIGN PATENT DOCUMENTS

| | | |
|---|---|---|
| JP | 2004185199 A | 7/2004 |
| KR | 20130048261 A | 5/2013 |
| WO | WO2012148828 A2 | 11/2012 |

OTHER PUBLICATIONS

Camp et al., U.S. Appl. No. 14/578,195, filed Dec. 19, 2014.
Chung et al., "A survey of Flash Translation Layer," Journal of Systems Architecture 55, 2009, pp. 332-343.
Deng et al., "Architectures and optimization methods offlash memory based storage system," Journal of Systems Architecture 57, 2011, pp. 214-227.
Dirik et al., "The Performance of PC Solid-State Disks (SSDs) as a Function of Bandwidth, Concurrency, Device Architecture, and System Organization," ISCA'09, Jun. 20-24, 2009, pp. 279-289.
Menon, "A performance Comparison of RAID-5 and Log-Structured Arrays," in Proceedings of the 4th IEEE International Symposium on High Performance Distributed Computing, 1995, pp. 167-178.
Patterson et al., "A Case for Redundant Arrays of Inexpensive Disks (RAID)," Proceedings of the 1988 ACM SIGMOD International Conference on Management of Data, Jun. 1988, pp. 3-14.
Ramachandran, et al., "Dynamic Data Fusion for Future Sensor Networks," ACM Transactions on Sensor Networks (TOSN), No. 3, 2006, pp. 404-443.
Anonymous, "Method for better performance by smart garbage collector invocation on SSD in high reliability environment," ip.com, No. 000223784, Nov. 29, 2012, pp. 1-6.
Rodeh, O. et. al., "Visualizing Block IO Workloads," IBM Research Report, Oct. 18, 2013, pp. 1-28.
Camp et al., U.S. Appl. No. 14/139,925, filed Dec. 24, 2013.
Ioannou et al., U.S. Appl. No. 14/866,315, filed Sep. 25, 2015.
List of IBM Patents or Patent Applications Treated as Related.
Hu et al., "Write Amplification Analysis in Flash-Based Solid State Drives," SYSTOR'09, May 4-6, 2009, pp. 1-9.
Hu et al., "The Fundamental Limit of Flash Random Write Performance: Understanding, Analysis and Performance Modelling," IBM Research, Mar. 31, 2010, pp. 1-15.
"Write Amplification," Wikipedia, Last Modified Jan. 21, 2014, pp. 1-13.
Min et al., "SFS: random write considered harmful in solid state drives," FAST'12 Proceedings of the 10th USENIX conference on File and Storage Technologies, Feb. 14, 2012, abstract only.
Hu et al., "Container Marking: Combining Data Placement, Garbage Collection and Wear Levelling for Flash," IBM Research, May 5, 2011, pp. 1-11.
Non-Final Office Action from U.S. Appl. No. 14/578,195, dated Jun. 16, 2016.
Non-Final Office Action from U.S. Appl. No. 14/566,639, dated Jul. 1, 2016.
Non-Final Office Action from U.S. Appl. No. 14/578,195, dated Dec. 15, 2016.

* cited by examiner

REDUCING WRITE AMPLIFICATION IN SOLID-STATE DRIVES BY SEPARATING ALLOCATION OF RELOCATE WRITES FROM USER WRITES

BACKGROUND

The present invention relates to data storage systems, and more specifically, this invention relates to solid-state drives separately allocating different write operations for improved separation of data and thereby reduced write amplification.

Performance characteristics of conventional NAND flash-based solid state drives (SSDs) are fundamentally different from those of traditional hard disk drives (HDDs). Data in conventional SSDs is typically organized in pages of 4, 8, or 16 KB sizes. Moreover, page read operations are typically one order of magnitude faster than write operations and latency neither depends on the current nor the previous location of operations.

However, memory locations must be erased in blocks prior to being written to. The size of an erase block unit is typically 256 pages and the erase operations takes approximately one order of magnitude more time than a page program operation. Due to the intrinsic properties of NAND flash, SSDs write data out-of-place whereby a mapping table maps logical addresses of the written data to physical ones. This mapping table is typically referred to as the Logical-to-Physical Table (LPT).

As flash cells exhibit read errors and/or failures due to wear or other reasons, additional redundancy is used within flash pages as well as across flash chips (e.g., RAID-5 or RAID-6 like schemes), the additional redundancy within flash pages possibly including error correction code (ECC) which, for example, may include BCH. While the addition of ECC in pages is relatively straightforward, the organization of flash blocks into RAID-like stripes is more complex. For instance, individual blocks are retired over time which requires either to reorganize the stripes, or to reduce the capacity of the stripe. As the organization of stripes together with the LPT defines the placement of data, SSDs utilize a Log-Structured Array (LSA) architecture, which combines these two methods.

The LSA architecture relies on out-of-place writes. In this approach, a flash page overwrite will result in writing the flash page data to a new location in flash, marking the old copy of the flash page data as invalid, and then updating the mapping information. Due to the limitations of current NAND flash technology, an invalidated data location cannot be reused until the entire block it belongs to has been erased. Before erasing, though, the block must undergo garbage collection, whereby any valid data in the block is relocated to a new block. Garbage collection of a block is typically deferred for as long as possible to maximize the amount of invalidated data in block, and thus reduce the number of valid pages that must be relocated, as relocated data causes additional write operations, and thereby increases write amplification.

BRIEF SUMMARY

A method, according to one embodiment, includes maintaining a first open logical erase block for user writes, maintaining a second open logical erase block for relocate writes, wherein the first and second open logical erase blocks are different logical erase blocks, receiving a first data stream having the user writes, transferring the first data stream to the first open logical erase block, receiving a second data stream having the relocate writes, and transferring the second data stream to the second open logical erase block.

A computer program product, according to one embodiment, includes a computer readable storage medium having program instructions embodied therewith, the program instructions readable and/or executable by a processor to cause the processor to: receive, by the processor, a first data stream and a second data stream concurrently, identify a first open logical erase block, transfer, by the processor, the first data stream to the first open logical erase block, terminate, by the processor, the transfer of the first data stream to the first open logical erase block, and cause, by the processor, transfer of the second data stream either (a) to a second open logical erase block that is different than the first logical erase block, or (b) to the first open logical erase block after the transfer of the first data stream to the first open logical erase block is terminated and the first open logical erase block is reassigned to the second data stream.

A system, according to one embodiment, includes a processor and logic integrated with and/or executable by the processor, the logic being configured to: maintain a first open logical erase block for user writes, maintain a second open logical erase block for relocate writes, wherein the first and second open logical erase blocks are different logical erase blocks, receive a first data stream having the user writes, transfer the first data stream to the first open logical erase block, receive a second data stream having the relocate writes, and transfer the second data stream to the second open logical erase block.

Other aspects and embodiments of the present invention will become apparent from the following detailed description, which, when taken in conjunction with the drawings, illustrate by way of example the principles of the invention.

DETAILED DESCRIPTION

Figure 1:
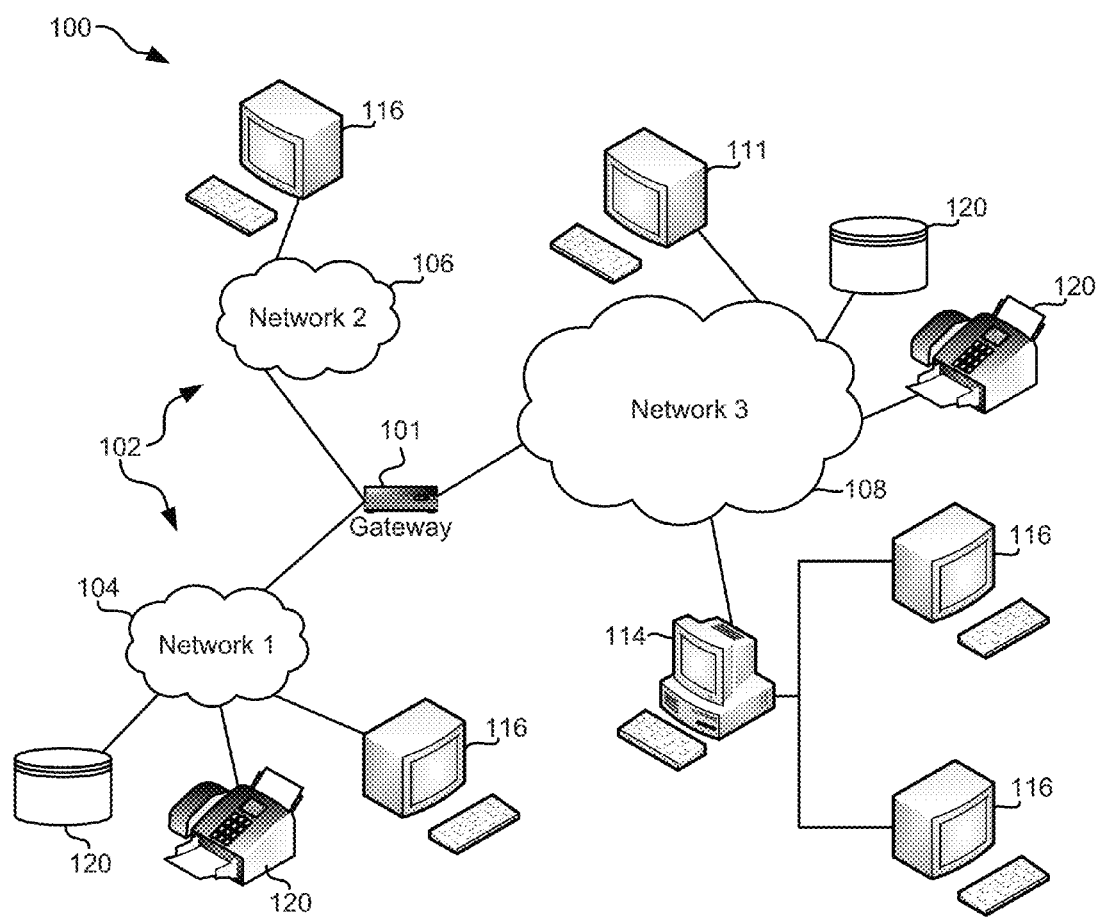
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, as used herein, the term "about" with reference to some stated value refers to the stated value ±10% of said value.

The following description discloses several preferred embodiments of systems, methods and computer program products for separately allocating different write operations for improved separation of data stored in solid-state drives, as will be described in further detail below.

In one general embodiment, a method includes maintaining a first open logical erase block for user writes, maintaining a second open logical erase block for relocate writes, wherein the first and second open logical erase blocks are different logical erase blocks, receiving a first data stream having the user writes, transferring the first data stream to the first open logical erase block, receiving a second data stream having the relocate writes, and transferring the second data stream to the second open logical erase block.

In another general embodiment, a computer program product includes a computer readable storage medium having program instructions embodied therewith, the program instructions readable and/or executable by a processor to cause the processor to: receive, by the processor, a first data stream and a second data stream concurrently, identify a first open logical erase block, transfer, by the processor, the first data stream to the first open logical erase block, terminate, by the processor, the transfer of the first data stream to the first open logical erase block, and cause, by the processor, transfer of the second data stream either (a) to a second open logical erase block that is different than the first logical erase block, or (b) to the first open logical erase block after the transfer of the first data stream to the first open logical erase block is terminated and the first open logical erase block is reassigned to the second data stream.

In yet another general embodiment, a system includes a processor and logic integrated with and/or executable by the processor, the logic being configured to: maintain a first open logical erase block for user writes, maintain a second open logical erase block for relocate writes, wherein the first and second open logical erase blocks are different logical erase blocks, receive a first data stream having the user writes, transfer the first data stream to the first open logical erase block, receive a second data stream having the relocate writes, and transfer the second data stream to the second open logical erase block.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
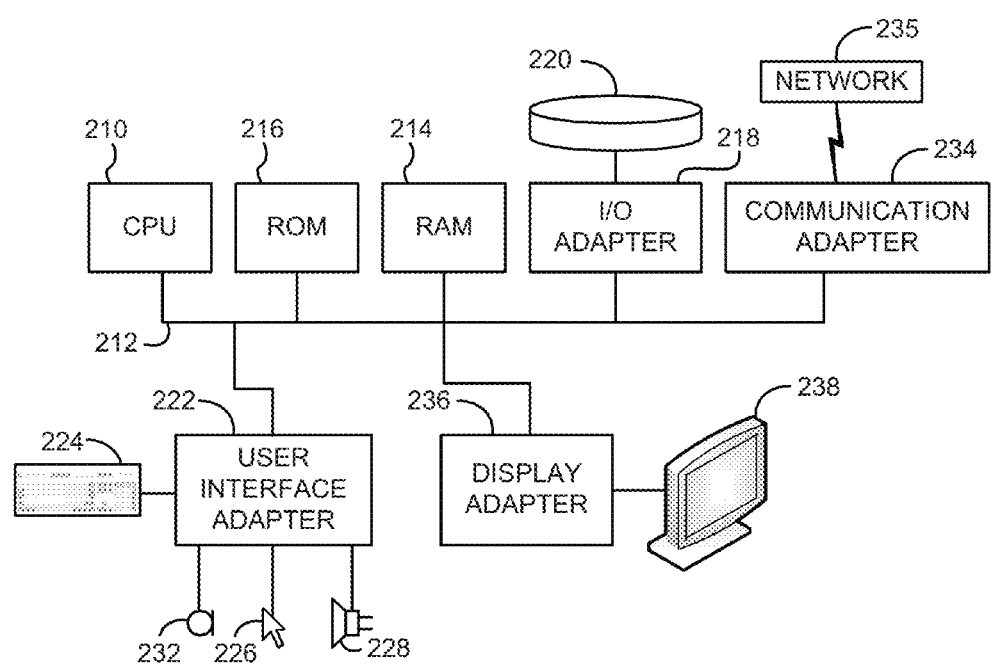
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using C, and/or C++ language, VHDL, Verilog, or other lower or higher-level programming and descriptive languages, with or without applying object oriented programming (OOP) methodology.

Figure 3:
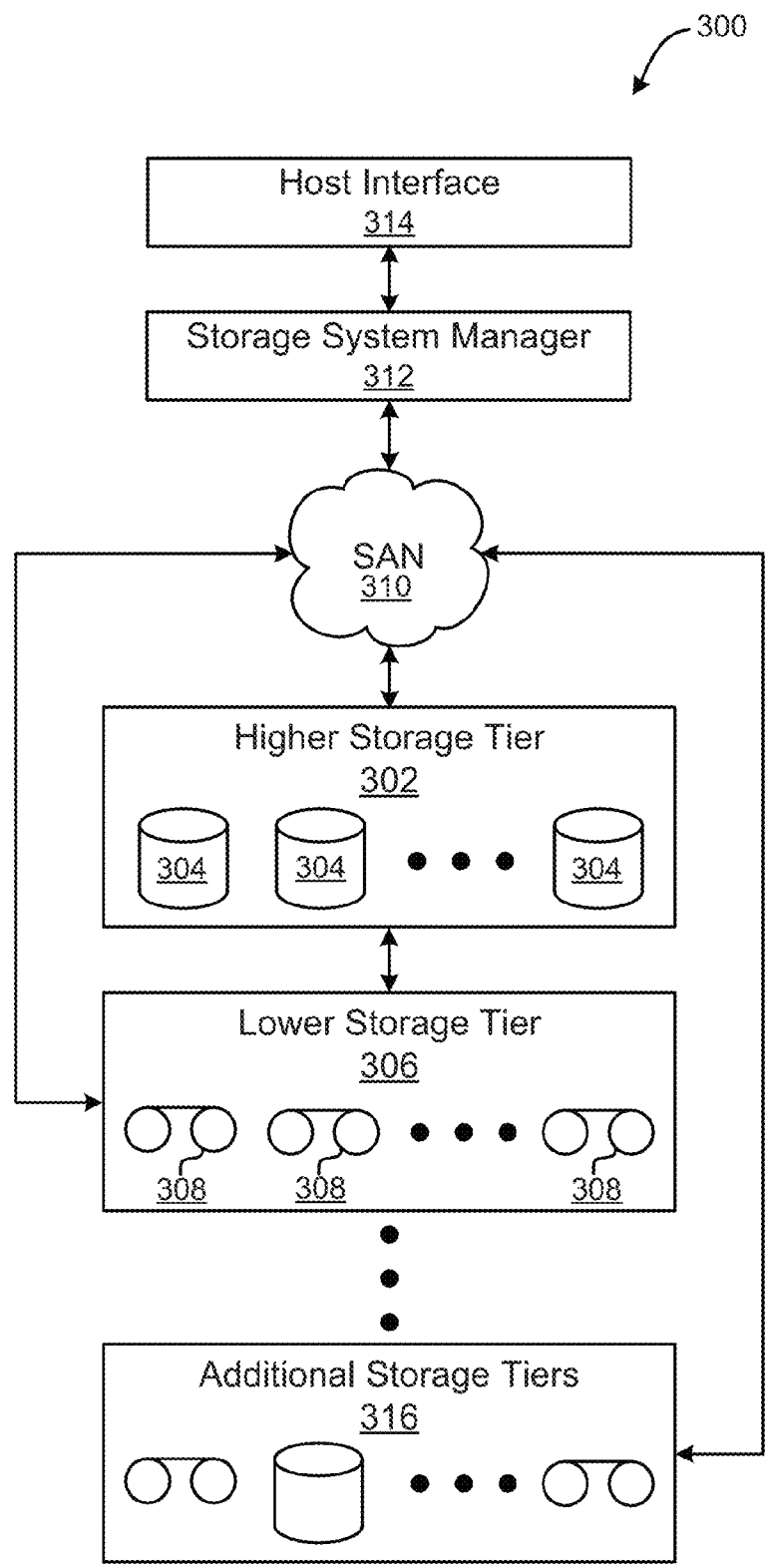
FIG. 3 is a tiered data storage system in accordance with one embodiment.
Figure 4:
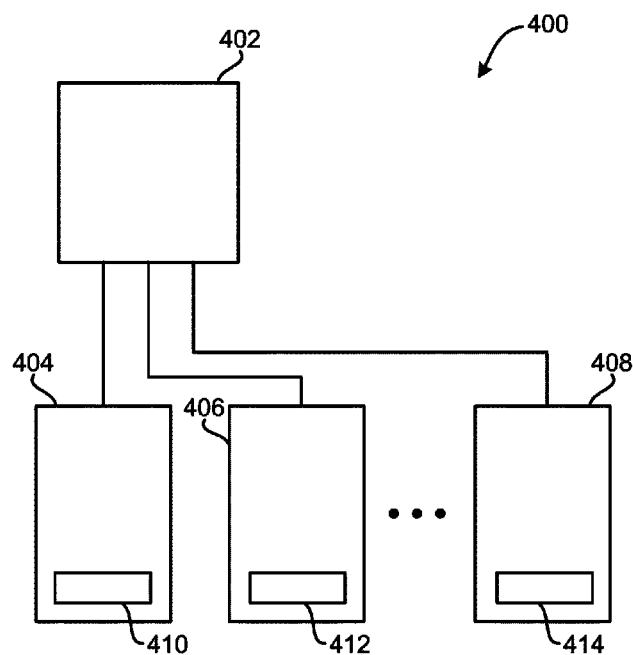
FIG. 4 is a diagram of a system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. However, in other approaches, a storage system manager 312 may communicate with a plurality of media on at least one higher storage tier 302, but no lower storage tier. The higher storage tier(s) 302 preferably may include one or more random access and/or direct access media 304, such as hard disks, nonvolatile memory (NVM), solid state memory in SSDs, flash memory, SSD arrays, flash memory arrays, etc., and/or others noted herein or known in the art. According to an example, FIG. 4 illustrates an exemplary architecture of a SSD system which may be used as a higher storage tier 302 depending on the desired embodiment.

Referring still to FIG. 3, the lower storage tier(s) 306 preferably includes one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Thus the lower storage tier 306 and/or the one or more additional storage tiers 316 may, in some approaches, include an SSD system architecture similar or the same as that illustrated in FIG. 4. Also, any of the higher storage tiers 302 and/or the lower storage tiers 306 may include any combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As described above, FIG. 4 illustrates an exemplary SSD system 400 architecture, in accordance with one embodiment. As an option, the present system 400 may be implemented in conjunction with features from any other embodiment listed herein, such as those described with reference to the other FIGS., such as FIG. 3. Of course, however, such system 400 and others presented herein may be used in various applications and/or in permutations which may or may not be specifically described in the illustrative embodiments listed herein. Further, the system 400 presented herein may be used in any desired environment. Thus FIG. 4 (and the other FIGS.) should be deemed to include any and all possible permutations.

System 400 includes a storage controller 402 which is coupled to multiple SSDs 404, 406, 408. Although only three SSDs are actually illustrated in FIG. 4, it should be noted that, depending on the desired embodiment, the system 400 architecture may include any number of SDDs.

Moreover, each of the SSDs 404, 406, 408 includes a corresponding controller 410, 412, 414 respectively. Although each of the SSDs 404, 406, 408 are illustrated in the present embodiment as having individual controllers associated therewith, in alternative approaches, two or more SSDs may share a common controller. For example, which is in no way intended to limit the invention, the SSDs 404, 406, 408 may be coupled to a common controller, e.g., similar to the manner in which the SSDs 404, 406, 408 are coupled to a common storage controller 402. In such approaches having two or more SSDs coupled to a common controller, the controller is preferably able to communicate with each of the SSDs coupled thereto individually.

Storage controller 402 and/or controllers 410, 412, 414 may be able to perform various functions on data stored in the SSDs, depending on the desired embodiment. Specifically, storage controller 402 and/or controllers 410, 412, 414 of SSD system 400 may include logic configured to perform any one or more of the following functions, which are in no way intended to be an exclusive list. In other words, depending on the desired approach, logic of a storage system may be configured to perform additional or alternative functions, as would be appreciated by one skilled in the art upon reading the present description.

Garbage Collection

Garbage collection in the context of Flash SSD controllers of the present description is intended to refer to the process of identifying blocks of data to be reclaimed for future usage and relocating all pages that are still valid therein. Moreover, depending on the specific controller and/or the respective garbage collection unit of operation, block-stripes may be identified for being reclaimed and/or relocated.

As alluded to above, the unit of the garbage collection operation is referred to herein as the Logical Erase Block (LEB). It should also be noted that an LEB may be any multiple of the physical flash block, which is a unit of physical erasure. Moreover, the organization of flash blocks into LEBs allows for adding RAID-like parity protection schemes among flash blocks from different flash chips, flash planes and/or channels as well as significantly enhancing performance through higher parallelism.

Heat Segregation

In the present context, the "heat" of a logical page refers to the rate (e.g., frequency) at which the logical page is written to (e.g., updated with new data). Pages that are considered as "hot" tend to have a frequent updated rate, while pages that are considered "cold" pages have an update rate slower than hot pages.

It should be noted that the number of read requests to and/or read operations performed on a logical page does not come into play when determining the heat of the logical page. For example, if data is frequently read from a particular logical page, that high read frequency does not mean that logical page will also have a high update rate. Rather, a high frequency of read operations performed on a given logical page may denote an importance, value, etc. of the data stored in the logical page.

By grouping logical pages of the same and/or similar heat values, heat segregation may be achieved. In particular, heat segregating methods may group hot logical pages together in certain flash blocks while cold logical pages are grouped together in separate flash blocks. Thus, a heat segregated LEB tends to be occupied by either hot or cold data.

The merit of heat segregation is two-fold. First, performing a garbage collection process on a hot block will prevent from triggering the relocation of cold data as well. In the absence of heat segregation, updates to hot data, which are performed frequently, also results in the undesirable relocations of all cold data collocated on the same LEB as the hot data is being relocated. Secondly, the relative heat of data can be utilized for wear-leveling purposes. For example, hot data may be placed in younger (e.g., healthier) blocks, while cold data may be placed on older (e.g., less healthy) blocks relative to those younger blocks. Thus, the rate at which relatively older blocks are exposed to wear is effectively slowed, thereby improving the lifetime of a given data storage system implementing heat segregation.

Write Allocation

Write allocation consists of placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, GC may take place concurrently with user write operations. For example, as a user (e.g., a host) writes data to a device, the device controller may continuously perform GC on LEBs with invalid data to make space for the new incoming data pages. As mentioned above, the LEBs having the GC being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired approach, logic of a storage system may be configured to perform additional or alternative functions, as would be appreciated by one skilled in the art upon reading the present description.

As previously mentioned, LSA architectures typically rely on out-of-place writes. In this approach, a flash page overwrite may result in writing the flash page data to a new location in flash, marking the old copy of the flash page data as invalid, and then updating the mapping information. However, due to the limitations of the NAND flash technology, an invalidated data location cannot be reused until the entire block it belongs to has been erased. Moreover, before a block erase is performed, all blocks belonging to the LEB must undergo garbage-collection, whereby any valid data in those blocks are relocated to a new LEB. Garbage collection of a block is typically deferred for as long as possible to maximize the amount of invalidated data in block, and thus reduce the number of valid pages that must be relocated, as relocated data may cause additional write operations, and thereby increase write amplification.

Write amplification is an undesirable phenomenon associated with flash memory and SSDs for which the actual amount of physical information written is a multiple of the logical amount intended to be written. Garbage collection usually takes place concurrently with user write operations. As a user (e.g., host) writes data to a device, a device controller continuously garbage collects LEBs with invalid data to make space for the new incoming data pages. As mentioned above, the LEBs under garbage collection will often have some pages that are still valid at the time of the garbage collection operation; thus, these pages that are still valid are relocated (e.g., written) to a new LEB. Moreover, because flash memory must be erased before it can be rewritten, the process to perform these operations results in relocating user data and metadata multiple times while write updates are performed. This multiplying effect increases the number of writes required over the life of an SSD which in turn shortens the time a given SSD can reliably operate. The increased number of writes also consumes bandwidth to the flash memory which mainly reduces random write performance to the SSD.

In view of the limited endurance of NAND flash (e.g., each cell can only endure a limited number of Program/Erase cycles), achieving a low write amplification is highly desired. Furthermore, with shrinking technology node in NAND flash, endurance is decreasing dramatically, thereby rendering any write reduction and/or write elimination even more desirable. However, in sharp contrast to the shortcomings of conventional products described above, various embodiments described and/or suggested herein are able to significantly reduce write amplification. According to specific embodiments, actively separating user (e.g., host) writes from relocate writes into different LEBs may significantly improve performance and/or reduce write amplification, e.g., as illustrated in FIG. 5A.

Figure 5A:
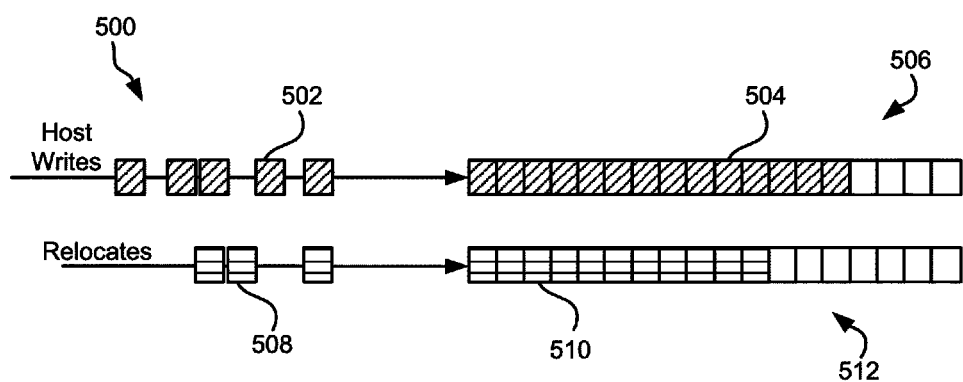
FIG. 5A is a representational diagram of write operation management in accordance with one embodiment.

FIG. 5A illustrates a representational diagram 500 of write operation management, in accordance with one embodiment. As shown, incoming host write operations 502 are preferably stored in a first open LEB 506 which is different than the second open LEB 512 which may be used to store incoming relocate write operations 508. Moreover, incoming write operations 502, 508 are stored in open slots of the open LEBs 506, 512 respectively, e.g., alongside data 504, 510 previously written therein.

It follows that different write operations are preferably actively separated into different LEBs. Thus, it is desirable that various embodiments included herein identify and/or separate different patterns and/or streams of user data. Moreover, the different patterns and/or streams of user data are preferably stored separately. Note that in case of two writes to a single logical address placed in different LEBs, one write might overtake the other one. To prevent data corruption, the LPT table update may be solely dependent on the actual arrival times of the write requests.

Various techniques described herein, or those which would be apparent to one skilled in the art upon reading the present description, may be used to identify different patterns and/or streams of data. For example, heat segregation may be implemented, e.g., with multiple heat levels. This active separation and/or management of write operations may be implemented by one or more controllers, e.g., such as controllers 402, 410, 412, 414 of FIG. 4.

FIG. 5A illustrates a diagram 500 of write operation management for a single incoming write-operation data stream, in addition to relocates which are strictly separated and placed in an individual open LEB. Alternate embodiments may include additional data streams. For example, FIG. 5B illustrates another representational diagram 550 of write operation management, in accordance with an alternate embodiment.

Looking to the representational diagram 550, each of the different incoming write operation data streams are stored in individual open LEBs 554. The multiple incoming write operation data streams 566, 568, 570, 572, 574, 576 are preferably stored in open LEBs 554 in which data similar or the same as the respective incoming write operation is already stored. For instance, looking to incoming data stream 568, the hot data corresponding to this data stream is stored in an LEB having other hot data 556 stored thereon. Similarly, each of the previously stored data 552, 558, 560, 562, 564 in the LEBs 554 is preferably similar or the same as the data of the respective incoming write operation data streams 566, 570, 572, 574, 576. It should also be noted that the incoming write operation data streams 566, 568, 570, 572, 574, 576 are intended to represent the throughput of each of the data streams. In other words, data streams 566, 568, 570, 572, 574, 576 represent the rate at which data is being received, e.g., by an LEB data manager directly from a data input. However, in some approaches, data may be stored in physical write queues and/or buffers before being transferred to open LEBs.

Figure 5B:
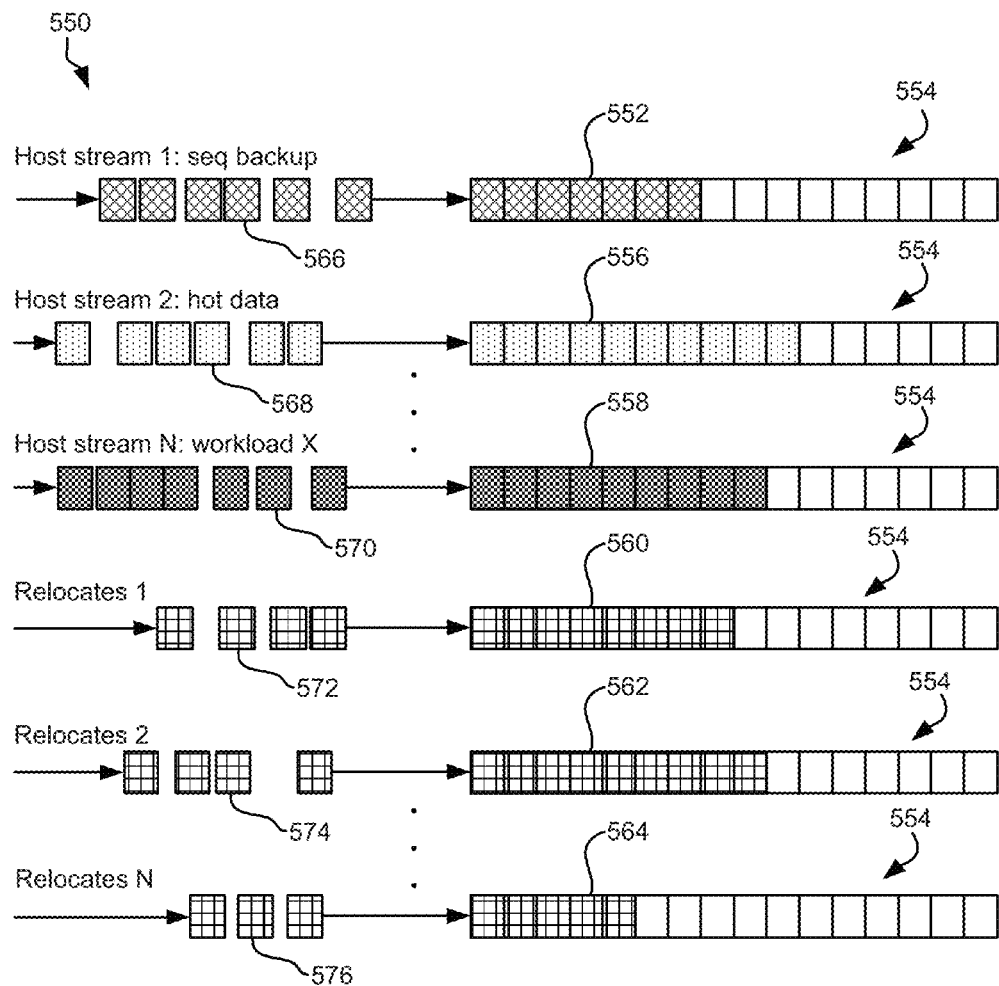
FIG. 5B is a representational diagram of write operation management in accordance with one embodiment.

Although desirable, the write operation management scheme illustrated in FIG. 5B may not be feasible for embodiments having a limited number of open LEBs. The number of open LEBs at any given time may vary, but two common causes of having a limited number of open LEBs include: (1) the lack of resources in physical embedded devices, and (2) the non-deterministic data-rate of certain data streams. For example, in an embodiment having 5 different incoming write operation data streams but only 3 open LEBs, alternate write operation management schemes may be utilized to accommodate each of the incoming data streams. The non-deterministic data-rate of certain data streams as mentioned above is a particularly common motivation for mixing different streams as seen in the various embodiment described herein, particularly in view of the difficulty in predicting whether a given data stream will provide enough data to fill an entire LEB. According to one example, two or more similar incoming write operation data streams may be merged (e.g., mixed) and stored in a common open LEB. Referring to the present description, a similarity between incoming write operation data streams may be based on one or more of: write operation type, a heat segregation value, a data rate, etc., depending on the desired approach.

However, it is preferred that some active separation of the incoming data is maintained. Particularly, various embodiments described herein include separation of streams of host writes from streams of relocates into different open LEBs. For example, data corresponding to incoming write operations may be split into two data streams, e.g., similar to the embodiment illustrated in FIG. 5A. According to this example, "stream 1" having host writes may correspond to a backup, e.g., having a sequential access pattern while "stream 2" may include hot data (in terms of heat segregation), e.g., such as file-system meta-data. By implementing such an active separation of the data both write and read efficiency may be improved. However, additional methods of implementing active separation of incoming data may also be performed, e.g., such as implementing heat segregation, as will be described in further detail below.

Separating for More Efficient Reads.

It is likely that reads will follow similar access pattern to writes. In other words, it is most likely that a user will want to read the data he wrote earlier, instead of data written by another user. Therefore, by separately storing data streams, fewer LEB will have to be accessed and less meta-data will have to be read on systems that store device meta-data in flash memory (as opposed to storing all meta-data in DRAM). On such systems, separation of streams of user data results also in faster reads.

Separating for More Efficient Writes.

A particular user is likely to write data in similar locations each time. This means that, by separating data streams, it is more likely that LEBs will be fully invalidated when, for example, a user overwrites his old backup. That is, separating data streams can significantly reduce write amplification, and therefore improve overall performance of the system.

As described above, incoming write operations may be actively separated using a number of different factors. For instance, incoming write operations may be split based on workload types, workstations where the operations were generated (each user will typically only read and write only their own data), process identifiers, applications, etc. Active separation may be implemented using any of the approaches described and/or suggested herein. However, according to an illustrative embodiment, FIG. 6 illustrates the flowchart of a method 600 which may be used to implement active separation.

Figure 6:
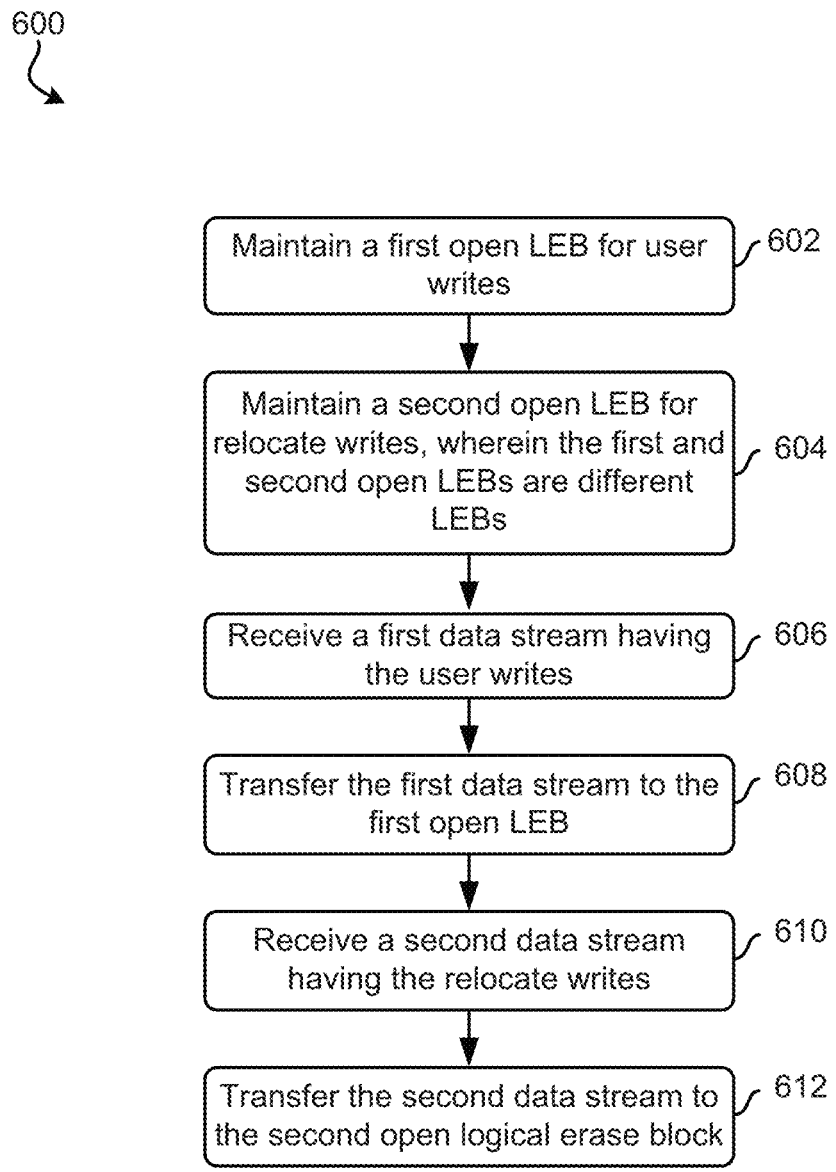
FIG. 6 is a flowchart of a method in accordance with one embodiment.

Now referring to FIG. 6, a flowchart of a method 600 is shown according to one embodiment. The method 600 may be performed in accordance with the present invention in any of the environments depicted in FIGS. 1-5B, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller (e.g., see 402, 410, 412, 414 of FIG. 4), or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, which includes maintaining a first open LEB for user writes. Moreover, operation 604 includes maintaining a second open LEB, different than the first open LEB, for relocate writes. In other words, it is preferred that the first and second open LEBs are not part of the same erase block. However, in other approaches, first and second LEBs may be of the same erase block.

Referring still to method 600, operation 606 includes receiving a first data stream having user writes, while operation 608 further includes transferring the first data stream to the first open LEB, e.g., by storing data from the data stream in open storage slots of the LEBs.

Moreover, a second data stream may be received in addition to the first data stream. According to an exemplary approach, a second data stream having relocate writes may be received as shown in operation 610. Furthermore, operation 612 includes transferring the second data stream to the second open LEB maintained in operation 604 above.

It is preferred that each open LEB is assigned to a certain stream of data upon being maintained (e.g., opened). Thus, according to some approaches, the first and/or second open LEBs may be assigned to a stream of data upon being maintained as seen above in operations 602, 604.

Moreover, it is also preferred that each of the open LEBs are assigned a timeout value. Thus, the first and/or second open LEBs of method 600 may further be assigned respective timeout values. According to different approaches, the timeout values may be assigned after the corresponding open LEB is maintained (e.g., as shown in operations 602, 604), upon receiving a data stream, upon transferring a data stream to an open LEB, etc., or based on any other desired condition and/or trigger. For example, if an embodiment includes three open LEBs to which three unique data streams are being transferred and a fourth data stream is being buffered in a cache, if the cache is filled to a certain capacity, the fourth data stream may be mixed with one of the three data streams being transferred to the three open LEBs, e.g., to prevent high latencies.

Depending on the desired embodiment, timeout values may include any desired value. However, optimal timeout values may desirably result in efficient separation of data streams, whereas suboptimal timeout values may result in high imbalance in the number of writes in different LEBs and/or high mixing of data streams. A high imbalance in the number of writes in different LEBs may result if the timeout is too large and/or slow data streams are assigned to open LEBs having larger timeouts, while other faster data streams are mixed together. Furthermore, a high mixing of data streams may result if a given timeout is too small and expires multiple times for each open LEB, each time assigning a different data stream to the open LEB. According to some approaches, the timeout value assigned to a given LEB may depend, at least in part on the size of cache available, e.g., for storing additional incoming data streams, and/or the throughput (e.g., data rate) of incoming data streams. For example, embodiments having smaller cache sizes may result in assigning lower timeout values, while embodiments having larger cache sizes may result in assigning higher (e.g., longer) timeout values. Similarly, embodiments having incoming data streams with higher throughputs may result in assigning lower timeout values, while embodiments having incoming data streams with lower throughputs may result in assigning higher (e.g., longer) timeout values.

In yet further embodiments, the timeout value may be determined at least in part based on a logical erase block write interval. A LEB write interval is the minimum time that elapses between two page-writes to the same open LEB. Specifically, timeout values may be between about two and about five times a corresponding length of the logical erase block write interval, but may be higher or lower depending on the desired approach. Smaller timeout values may reduce the probability that slow data streams will occupy an open LEB, while larger timeout values reduce the mixing of data streams, even if a data stream temporarily reduces its data rate.

It follows that if a timeout for a given open LEB expires, it may be determined that the assignment of the data-stream to the open LEB experiencing the expired timeout was not ideal. Eventually, data rates of different streams of data will diminish, and the open LEB assigned to these diminished streams will fill at low rate or may completely stop filling. This may happen, for example, if a user finishes his backup or stops logging data to be stored. As a result, the timeout of an associated one or more LEBs will expire and the associated LEBs will be re-assigned to another data stream, preferably one having a more intensive data rate resembling the initially intended characteristics of the LEB, e.g., hot data.

As a result, it is preferred that an LEB having experienced an expired timeout is re-assigned to a stream of data different than the previous stream. For example, looking to FIGS. 7A-7B, a device 700 which supports 4 open LEBs 724, 726, 728, 730 is illustrated in accordance with one embodiment. As an option, the present device 700 may be implemented in conjunction with features from any other embodiment listed herein, such as those described with reference to the other FIGS., such as FIG. 6. Of course, however, such device 700 and others presented herein may be used in various applications and/or in permutations which may or may not be specifically described in the illustrative embodiments listed herein. Further, the device 700 presented herein may be used in any desired environment. Thus FIGS. 7A-7B (and the other FIGS.) may be deemed to include any possible permutation.

Figure 7A:
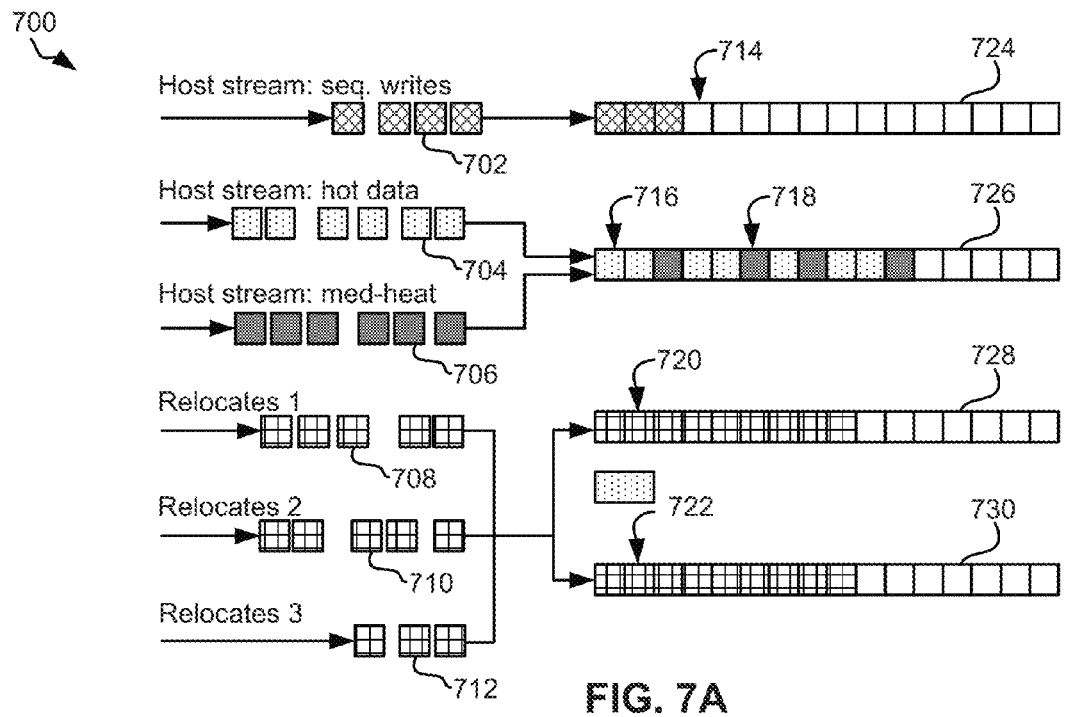
FIGS. 7A-7B are representational diagrams of write operation management on a device in accordance with one embodiment.

As illustrated in FIG. 7A, each of the open LEBs 724, 726, 728, 730 are assigned different combinations of incoming data streams. Specifically, open LEB 724 is assigned a single data stream 702 of sequential writes, while open LEBs 726, 728, 730 are assigned to multiple data streams. Open LEB 726 is assigned to a mixture of hot and medium heat data streams 704, 706 respectively, while open LEBs 728, 730 are assigned to mixtures of relocate data streams 708, 710, 712. Data from each of the incoming data streams 702, 704, 706, 708, 710, 712 are transferred to each of the open LEBs, preferably starting at the first available storage slot of the LEBs behind previously transferred data 714, 716, 718, 720, 722.

Figure 7B:
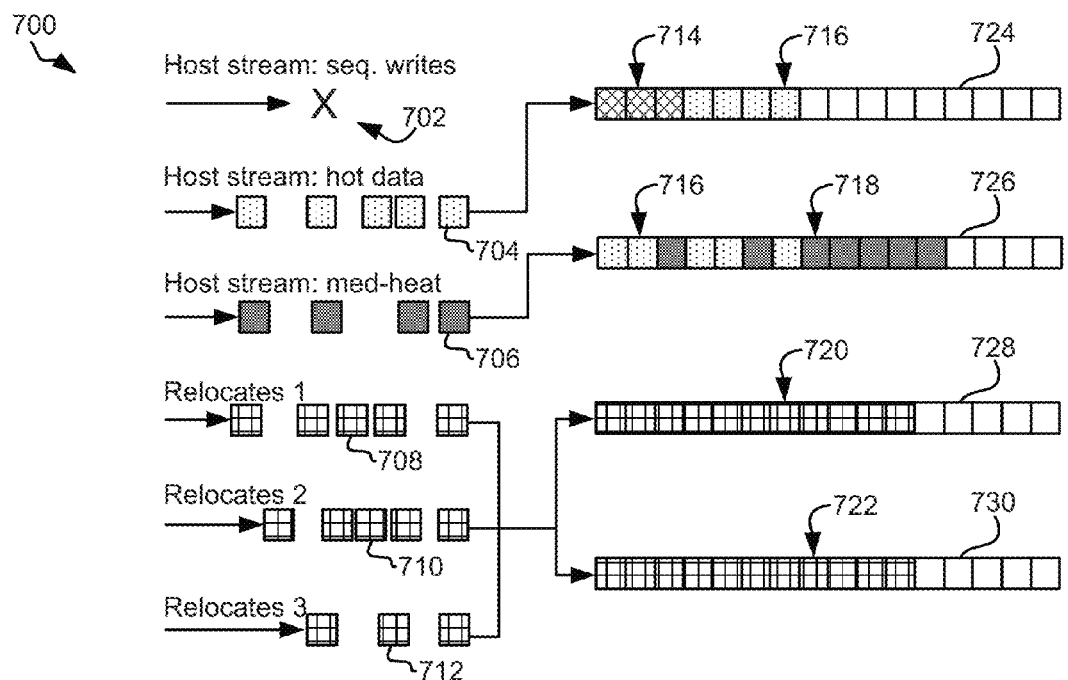

However, looking to FIG. 7B, open LEB 724 experiences a timeout of incoming host write operation data stream 702 and as a result, open LEB 724 is reassigned to a different data stream 704. Consequently, rather than receiving a mixture of incoming data streams, open LEB 726 receives data only from medium heat data stream 706. It follows that any of the embodiments described and/or suggested herein may be able to reassign at least one of the open LEBs to a different data stream when the timeout of the at least one open LEB expires.

It should be noted that although FIG. 7B illustrates a specific rearrangement of the data streams with respect to the different open LEBs resulting from reaching a timeout value, various other in use embodiments may result in a different assignment of data streams. For example, which is in no way intended to limit the invention, hot and medium heat data streams may remain assigned to open LEB 726 while data streams Relocate 1 708, Relocate 2 710 and/or Relocate 3 712 may be reassigned to open LEB 724. In yet a different embodiment, open LEB 724 may be reassigned to an incoming data stream (not shown) being stored in cache, e.g., waiting to be transferred to an available open LEB.

Figure 8A:
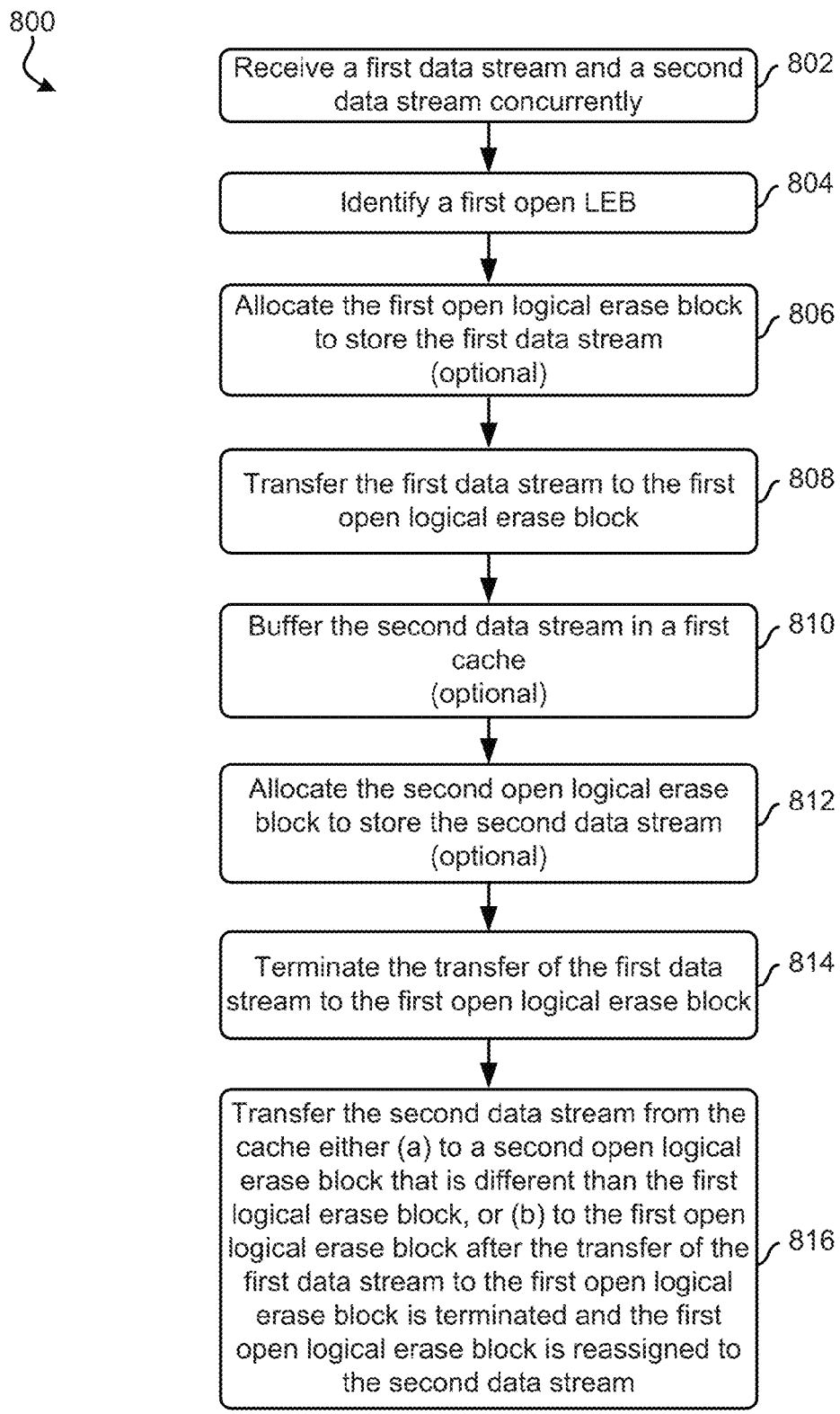
FIG. 8A is a flowchart of a method in accordance with one embodiment.

Referring now to FIG. 8A, a method 800 is illustrated in accordance with one embodiment. As an option, the present method 800 may be implemented in conjunction with features from any other embodiment listed herein, such as those described with reference to the other FIGS., such as method 600 FIG. 6. Of course, however, such method 800 and others presented herein may be used in various applications and/or in permutations which may or may not be specifically described in the illustrative embodiments listed herein. Further, the method 800 presented herein may be used in any desired environment. Thus FIG. 8A (and the other FIGS.) may be deemed to include any possible permutation. Specifically, any one or more of the operations listed below may be performed using a computer program product having a computer readable storage medium with program instructions embodied therewith, the program instructions readable and/or executable by a device e.g. computer, processor, switch, router, processing circuit, etc. to cause the device to perform any one or more of the operations of method 800.

Looking to FIG. 8A, operation 802 of method 800 includes receiving a first data stream and a second data stream concurrently (e.g., at about the same time), while operation 804 includes identifying a first open logical erase block. However, it should also be noted that although LEBs are included in the various embodiments herein, physical erase blocks may be used alternatively or additionally, e.g., depending on the desired embodiment.

Referring still to FIG. 8A, optional operation 806 includes allocating the first open logical erase block to store the first data stream, and operation 808 includes transferring the first data stream to the first open logical erase block.

Moreover, method 800 may incorporate one or both of optional operations 810, 812 which include buffering the second data stream in a cache, and allocating the second open logical erase block to store the second data stream, respectively. Furthermore, operation 814 includes terminating the transfer of the first data stream to the first open logical erase block. According to one approach, the transfer of the first data stream to the first open logical erase block may be terminated upon filling a first cache. In other words, when the first cache is filled and unable to store any more of the second data stream, the transfer of the first data stream to the first open LEB may be terminated, e.g., such that the second data stream may be stored in the first open LEB to accommodate for the continued flow of incoming data from the second data stream. However, in alternate embodiments, the transfer of the first data stream to the first open logical erase block may be terminated upon the expiration of a timeout value of the first open LEB.

With continued reference to method 800 of FIG. 8A, operation 816 includes transferring the second data stream from the cache either (a) to a second open logical erase block that is different than the first logical erase block, or (b) to the first open logical erase block after the transfer of the first data stream to the first open logical erase block is terminated and the first open logical erase block is reassigned to the second data stream.

Figure 8B:
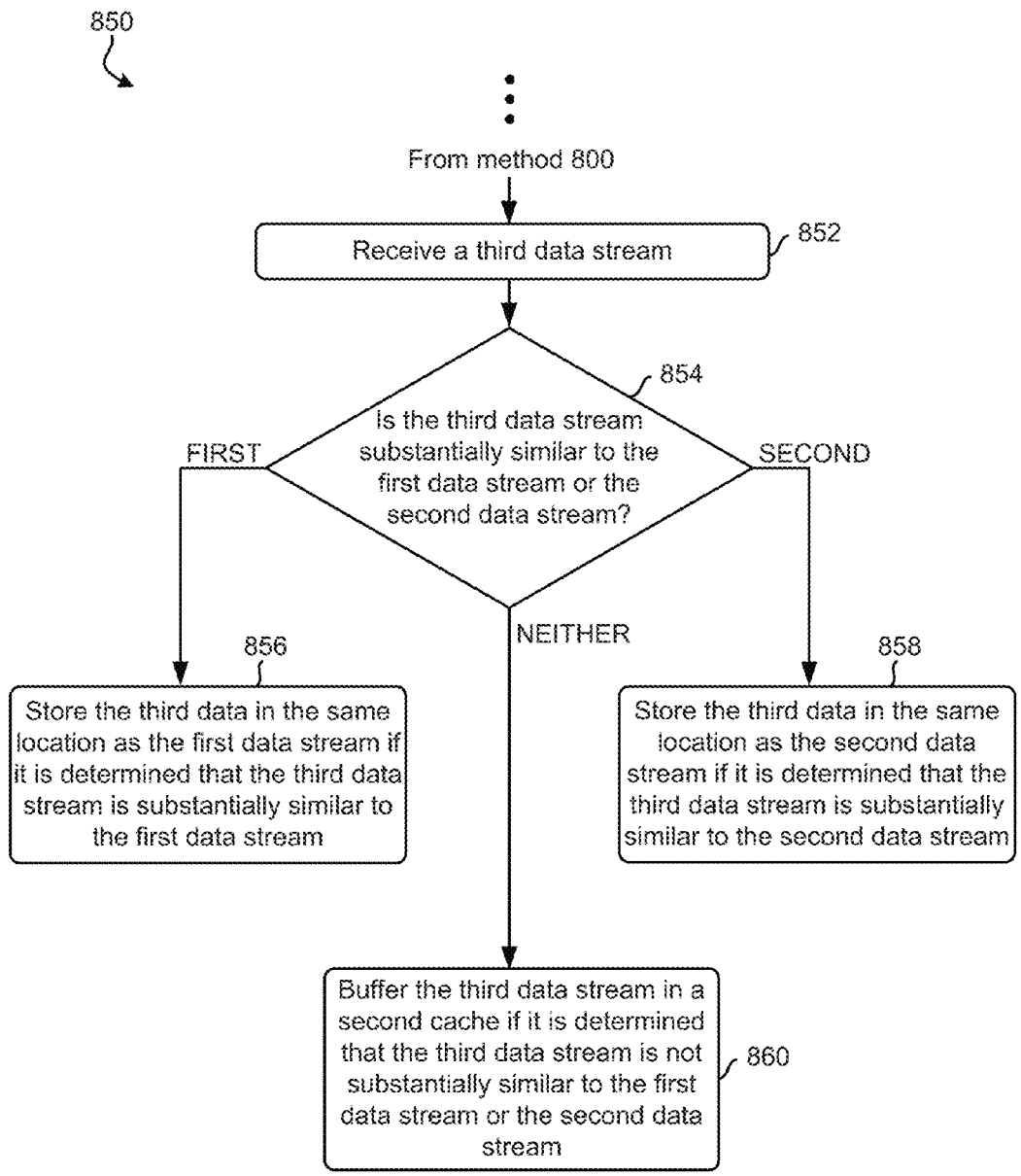
FIG. 8B is a flowchart of a method which is a continuation of the method in FIG. 8A, in accordance with one embodiment.

In addition to performing the aforementioned operations of FIG. 8A, FIG. 8B illustrates a method 850 intended to illustrated an exemplary extension of the operations included in method 800, in accordance with one embodiment. As an option, the present method 850 may be implemented in conjunction with features from any other embodiment listed herein, such as those described with reference to the other FIGS., such as FIGS. 6, 8A. Of course, however, such method 850 and others presented herein may be used in various applications and/or in permutations which may or may not be specifically described in the illustrative embodiments listed herein. Further, the method 850 presented herein may be used in any desired environment. Thus FIG. 8B (and the other FIGS.) may be deemed to include any possible permutation. Furthermore, as previously mentioned, any one or more of the operations listed below may be performed using a computer program product having a computer readable storage medium with program instructions embodied therewith, the program instructions readable and/or executable by a device e.g. computer, processor, switch, router, processing circuit, etc. to cause the device to perform any one or more of the operations of method 850.

Looking to FIG. 8B, operation 852 of method 850 includes receiving a third data stream in addition to the first and second data streams of operation 802 above. Furthermore, method 850 includes determining if the third data stream is substantially similar to the first data stream or the second data stream. See decision 854.

If decision 854 determines that the third data stream is substantially similar to the first data stream, the third data stream is stored in the same location as the first data stream. See operation 856. Similarly, if decision 854 determines that the third data stream is substantially similar to the second data stream, the third data stream is stored in the same location as the second data stream. See operation 858. However, if decision 854 determines that the third data stream is not substantially similar to the first data stream or the second data stream, the third data stream is buffered in a second cache as seen in operation 860. Data from the second cache may later be stored in a new stream, e.g., when an LEB for a new stream becomes available. For approaches in which the second cache is full before an LEB for a new stream is made available, other criteria of the stream may be used to decide into which existing stream data pushed out of the cache is stored.

It follows that any received data stream may be mixed with pre-existing data streams based on a comparison between the data streams. Moreover, a comparison between data streams may be based on, at least in part on a speed of the data streams, a number of open LEBs, a number and/or size of cache, a temperature of data (e.g., with reference to heat segregation), etc., or any other factors which would be appreciated by one skilled in the art upon reading the present description.

As mentioned immediately above, a comparison of data streams may, in some approaches, be based on a heat segregation value (e.g., temperature) of the data.

Improved separation of data streams and relocates as described herein benefits both embodiments which implement heat segregation as well as those that do not implement heat segregation. In other words, while implementation of heat segregation is desired in the various embodiments described and/or suggested herein, the separation of data streams and relocates also significantly improves those embodiments that do not implement heat segregation, as will soon become apparent.

For embodiments without heat segregation, the active separation of data streams and relocates improves performance by exploiting temporal locality of accesses. This is a result of the phenomenon that user data written at approximately the same time is more likely to be collocated in the same LEB. As a result, future data reads will be more efficient as they will need to access less meta-data in approaches that store metadata in NAND Flash memory while they cache only parts of the metadata in DRAM (e.g., employ metadata paging). Furthermore, future data overwrites are more likely to invalidate a higher percentage of a given LEB, thereby improving (e.g., reducing) the write amplification of such embodiments.

Alternatively, for embodiments that implement heat segregation, the separation of data streams brings an additional benefit. Associated LEBs may contain only data of similar heat values, and therefore the LEBs will be more invalidated at the time they are selected for garbage collection. As a result, very little relocation is required which greatly improves (i.e., reduces) write amplification.

This is in sharp contrast to conventional products in which hot data is mixed with data that is colder, and even possibly with relocate requests, thereby greatly degrading (i.e., increasing) write amplification.

It follows that, any of the embodiments described herein may be able to perform heat segregation on data streams, as would be appreciated by one skilled in the art upon reading the present description. Specifically, various embodiments described herein may be able to perform heat segregation on the data streams by assigning a unique open logical erase block to a data stream having data hotter than the data in another data stream. It should further be noted that, with reference to the present description, "hotter" is intended to mean that the hotter data is more frequently updated, data assigned with a higher priority, etc., as would be appreciated by one skilled in the art upon reading the present description. However, in alternate embodiments, the temperature of data may be determined by the frequency at which it is updated and/or accessed. Referring back to FIG. 7B, host data stream 704 having hot data is transferred to a different open LEB 724 than the LEB 726 to which host data stream 706 having medium heat is transferred to.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   maintaining, by a processor, a first open logical erase block for user writes;
   maintaining, by the processor, a second open logical erase block for relocate writes,
   wherein the first and second open logical erase blocks are different logical erase blocks;
   receiving, by the processor, a first data stream having the user writes;
   transferring, by the processor, the first data stream to the first open logical erase block;
   receiving, by the processor, a second data stream having the relocate writes; and
   transferring, by the processor, the second data stream to the second open logical erase block;
   assigning a first timeout value to the first open logical erase block;
   assigning a second timeout value to the second open logical erase block;
   reassigning at least one of the first and second open logical erase blocks to a different data stream in response to at least one of the first and second timeouts of the respective first and second open logical erase blocks expiring.

2. The method of claim 1, wherein the first and second timeout values are determined based on a logical erase block write interval.

3. The method of claim 2, wherein the first and second timeout values are between about two and about five times a length of the logical erase block write interval.

4. The method of claim 1, comprising:
   performing heat segregation on the data streams by assigning a third open logical erase block to a data stream having data hotter than data in another data stream.

5. The method of claim 1, comprising receiving a third data stream, and mixing the third data stream with the first data stream, the second data stream and/or another data stream when an open logical erase block is not available for assignment to the third data stream.

6. A computer program product comprising a computer readable storage medium having program instructions embodied therewith, the program instructions readable and/or executable by a processor to cause the processor to:
   receive, by the processor, a first data stream and a second data stream concurrently, wherein the first data stream includes user writes, wherein the second data stream includes relocate writes;
   identify, by the processor, a first open logical erase block;

transfer, by the processor, the first data stream having the user writes to the first open logical erase block;

terminate, by the processor, the transfer of the first data stream to the first open logical erase block;

cause, by the processor, transfer of the second data stream having the relocate writes either (a) to a second open logical erase block that is different than the first logical erase block, or (b) to the first open logical erase block after the transfer of the first data stream to the first open logical erase block is terminated and the first open logical erase block is reassigned to the second data stream;

assign, by the processor, a first timeout value to the first open logical erase block;

assign, by the processor, a second timeout value to the second open logical erase block; and reassign, by the processor, at least one of the first and second an open logical erase block to a different data stream if in response to at least one of the first and second timeouts of the respective first and second open logical erase blocks expiring.

7. The computer program product of claim 6, wherein terminating the transfer of the first data stream to the first open logical erase block is performed upon filling a first cache.

8. The computer program product of claim 6, wherein the first and second timeout values are determined based on logical erase block write intervals.

9. The computer program product of claim 6, wherein the program instructions are further readable and/or executable by the processor to cause the processor to:

perform, by the processor, heat segregation on the received data streams.

10. The computer program product of claim 6, wherein the program instructions are further readable and/or executable by the processor to cause the processor to:

receive, by the processor, a third data stream;

determine, by the processor, if the third data stream is substantially similar to the first data stream or the second data stream;

store, by the processor, the third data stream in a same location as the first data stream if it is determined that the third data stream is substantially similar to the first data stream;

store, by the processor, the third data stream in the same location as the second data stream if it is determined that the third data stream is substantially similar to the second data stream; and buffer, by the processor, the third data stream in a second cache if it is determined that the third data stream is not substantially similar to the first data stream or the second data stream.

11. A system, comprising:

a processor and logic integrated with and/or executable by the processor, the logic being configured to:

maintain a first open logical erase block for user writes;

maintain a second open logical erase block for relocate writes, wherein the first and second open logical erase blocks are different logical erase blocks; receive a first data stream having the user writes; transfer the first data stream to the first open logical erase block; receive a second data stream having the relocate writes; and transfer the second data stream to the second open logical erase block;

assign a first timeout value to the first open logical erase block;

assign a second timeout value to the second open logical erase block;

reassign at least one of the first and second open logical erase blocks to a different data stream in response to at least one of the first and second timeouts of the respective first and second open logical erase blocks expiring, wherein the first and second timeout values are determined based on a logical erase block write interval.

12. The system of claim 11, wherein the logic is further configured to:

perform heat segregation on the data streams by assigning a third open logical erase block to a data stream having data hotter than data in another data stream.

13. The system of claim 11, further comprising receiving a third data stream, and mixing the third data stream with the first data stream, the second data stream and/or another data stream when an open logical erase block is not available for assignment to the third data stream.

14. The system of claim 13, wherein mixing the third data stream with the first data stream, the second data stream and/or another data stream is based on a comparison between information associated with the first data stream, the second data stream and/or another data stream, the information being selected from a group consisting of a speed of the data streams, a number of open logic erase blocks, a number and/or size of cache, and a temperature of data.

* * * * *